United States Patent [19]

Juchem

[11] Patent Number: 5,178,898
[45] Date of Patent: Jan. 12, 1993

[54] METHOD OF MAKING WETTABLE FOODS FOR DOMESTIC ANIMALS

[75] Inventor: Franz-Josef Juchem, Eppelborn, Fed. Rep. of Germany

[73] Assignee: Juchem GmbH, Eppelborn, Fed. Rep. of Germany

[21] Appl. No.: 795,893

[22] Filed: Nov. 19, 1991

[30] Foreign Application Priority Data

Nov. 26, 1990 [DE] Fed. Rep. of Germany ....... 4037497

[51] Int. Cl.⁵ .............................................. A23K 1/00
[52] U.S. Cl. ................................... 426/635; 426/520; 426/573; 426/576; 426/623; 426/630; 426/634; 426/657; 426/805
[58] Field of Search .................. 426/657, 635, 576, 96, 426/623, 630, 634, 641, 646, 805, 807, 520, 573, 92, 285

[56] References Cited

U.S. PATENT DOCUMENTS

| | | | |
|---|---|---|---|
| 4,198,440 | 4/1980 | Le Jeune | 426/805 |
| 4,273,788 | 6/1981 | Bone et al. | 426/805 |
| 4,332,832 | 6/1982 | Buckley et al. | 426/805 |
| 4,348,418 | 9/1982 | Smith et al. | 426/805 |
| 4,614,664 | 9/1986 | Karwowski | 426/573 |
| 4,707,375 | 11/1987 | Buckley et al. | 426/805 |
| 4,746,528 | 5/1988 | Prest et al. | 426/805 |
| 4,784,862 | 11/1988 | Wotherspoon | 426/805 |
| 5,087,473 | 2/1992 | Leo | 426/805 |

Primary Examiner—R. B. Penland
Attorney, Agent, or Firm—Peter K. Kontler

[57] ABSTRACT

A dry food for domestic dogs or cats is prepared by moistening and crushing cereals and/or legumes and thereupon drying the crushed substance at a temperature of not more than between 50° and 70° C. to form flakes, by drying chunks or lumps of meat, fish and/or comminuted vegetables, and by mixing the chunks or lumps and flakes with each other and with effective quantities of micronutrients and/or a gelling agent. The resulting dry food can be stored in bags and can be served dry or subsequent to contacting with water, milk or another liquid.

10 Claims, No Drawings

METHOD OF MAKING WETTABLE FOODS FOR DOMESTIC ANIMALS

BACKGROUND OF THE INVENTION

The invention relates to the making of foods for animals, and more particularly to improvements in methods of making foods for domestic animals, such as dogs and cats. Still more particularly, the invention relates to improvements in methods of making moistenable or wettable pet foods.

It is well known to make moistenable or wettable foods (particularly for dogs or cats and hereinafter called pets for short) from a mixture containing cereals, legumes, meat, fish and/or vegetables. An important advantage of moistenable pet foods is that, in contrast to moist or wet foods, they need not be confined in cans. Disposal of empty cans creates many ecological problems and contributes to the cost of pet foods. Furthermore, the weight of a can which contains wet food is a multiple of the weight of the edible contents without moisture. Moreover, it is not necessary to add one or more preservatives which are standard ingredients of canned moist pet foods.

Another important advantage of pet foods which are sold in dry condition is that they can be stored for long periods of time upon opening of bags, envelopes or other containers which are used for confinement of such foods. Thus, the purchaser of a bag of pet food which can be served dry, or with water or milk or another liquid added, can withdraw a desired quantity of food and the withdrawn quantity is thereupon mixed with a liquid prior to serving. The remainder of the food can remain in the bag for future use in contrast to canned wet pet foods.

A further important advantage of pet foods which are stored in dry condition is that such foods can be stored in bags or other deformable containers of any desired size and/or shape which is highly desirable for the purposes of convenient storage and/or transport. The containers can be made of paper or of any other readily decomposable material with attendant elimination of ecological problems as well as with considerable savings for transport and the possibility to reduce the dimensions of storing facilities.

A drawback of presently known dry pet foods which contain cereals and/or legumes is that their cost is rather high, particularly because their preparation involves a thermal treatment, for example, roasting and subsequent pressing to form particles of desired size and/or shape. Such thermal treatment affects the taste and certain other desirable characteristics of the thus obtained dry pet foods.

Another drawback of presently known dry pet foods is that their composition enables an animal (e.g., a dog or a cat) to select from the mixture those fragments (e.g., pieces of dried meat or fish) which the animal prefers over the other constituents (such as particles of dried cereals, pieces of vegetables and/or legumes). This deprives the pet of a desirable balanced diet because the animal avoids the consumption of constituents which are of considerable nutritional-physiological importance but are less favored than certain other constituents.

OBJECTS OF THE INVENTION

An object of the invention is to provide a novel and improved method of making moistenable or wettable foods for animals, particularly for domestic dogs or cats.

Another object of the invention is to provide a method which ensures that the treatment does not affect the taste and/or other desirable characteristics of the ingredients.

A further object of the invention is to provide a method of making a pet food of such nature that the animal is incapable of consuming only certain ingredients of the product.

An additional object of the invention is to provide a method which renders it possible to produce a pet food having a long shelf life.

Still another object of the invention is to provide a method which renders the cereals and/or legumes and/or vegetables in the food more palatable to a pet than heretofore known methods.

A further object of the invention is to provide a pet food which is obtained in accordance with the above outlined method.

Another object of the invention is to provide a pet food which can be wetted with any one of a number of customary liquids including water, milk and others.

SUMMARY OF THE INVENTION

The invention resides in the provision of a method of making moistenable or wettable food for animals, particularly a wettable food for domestic animals. The improved method comprises a first step of forming dry flakes of a first ingredient which is selected from the group consisting of cereals and legumes (such as beans and/or peas) including moisturizing, crushing and thereafter drying the first ingredient, preferably gently at a temperature not higher than between approximately 50° and 70° C.; a second step of forming small or relatively small chunks or lumps of a second ingredient which is selected from the group consisting of animal proteins (this term is used to embrace meat, including poultry, and fish) and vegetables, including gently drying the second ingredient; and a third step of mixing flakes of the first ingredient and chunks or lumps of the second ingredient with at least one gelling agent, such as polysaccharide, a protein or a hydrolysate of a protein.

The step of making flakes preferably further comprises husking the first ingredient prior to moisturizing.

The method can also comprise the step of adding at least one micronutrient, preferably not later than in the course of the mixing step. It is presently preferred to add the micronutrient in encapsulated form.

The novel features which are considered as characteristic of the invention are set forth in particular in the appended claims. The improved method itself, however, together with additional features and advantages thereof, will be best understood upon perusal of the following detailed description of certain presently preferred specific embodiments.

DESCRIPTION OF PREFERRED EMBODIMENTS

In accordance with the improved method, pet food is obtained by preferably thoroughly mixing at least three ingredients the first of which is in the form of dry flakes, the second of which is in the form of dry lumps or chunks, and the third of which is a gelling agent. The gelling agent ensures that the mixture is converted into a gel in response to contact with water, milk or another suitable liquid. Dry flakes are obtained by moistening and thereupon crushing and gently drying (preferably at a temperature not higher than between approximately 50° and 70° C.) a quantity of cereals and/or legumes. The moistening step is or can be preceded by husking. The just described mode of making flakes entails a physical modification of starch granulae of the cereals and/or legumes which is desirable and advantageous because it contributes to the ease of digestion by a dog or cat or any other domestic animal which is accustomed to eating dry or moistenable pet foods. Moreover, the just discussed formation of flakes ensures the destruction of all or nearly all pathogenic germs. Physical destruction (bursting or crushing) of starch granulae exposes the enzymes which are embodied in the cereals with attendant minor chemical changes and/or changes of taste, the same as occur when the cereals are crushed by wild animals. All in all, the just described mode of making dry flakes of cereal is much gentler than conventional procedures which involve roasting of cereals. The treatment of legumes (such as beans or peas) is or can be identical with the treatment of cereals.

The second ingredient is in the form of small chunks or lumps and consists of animal proteins (such as meat, poultry and/or fish) and/or chopped and/or otherwise comminuted vegetables. The constituent or constituents of the second ingredient are subjected to a gentle drying action to avoid denaturalization of proteins and/or other essential ingredients and/or undesirable changes of matrix. This ensures that the chunks or lumps of the second ingredient are present in a form to which a wild animal is accustomed and which is equally acceptable to and preferred by domestic animals.

The next step involves intimate intermixing of the flakes and chunks or lumps. Such step is preferably preceded by or takes place simultaneously with admixture of one or more important trace elements or micronutrients, such as vitamins, minerals and/or others, for example, essential nutrients including fats and/or amino acids. The micronutrients are preferably admixed in the form of pellets or the like, i.e., in encapsulated condition to ensure long shelf and storage life. In addition, the product should also contain one or more gelling agents which can be added prior to or in the course of the mixing step. Presently preferred gelling agents include polysaccharides, proteins and hydrolysates of proteins.

By way of example, a ready-to-pack pet food can contain approximately 70 percent by weight of flakes containing cereals and/or legumes, approximately 15 percent of dried chunks of animal protein (such as meat and/or fish), 10 percent dried vegetables (which can be chopped and/or otherwise comminuted prior or subsequent to drying) and 5 percent of gelling agent and micronutrients.

Depending on the intended use of the ultimate product (e.g., as cat food or dog food), the mixture can further contain egg white, one or more fats, one or more carbohydrates and/or trace elements in quantities that ensure that the taste closely resembles that of foods for wild animals. This kind of food offers many variations concerning the ingredients and can be adapted for all breeds of pets as well as used as medical food with pharmaceutical agents as prescribed by a veterinarian.

When the product is to be put to use, a certain quantity is removed from the bag, envelope or a similar receptacle and is mixed with water or another liquid to impart a desired moisture content. The solid particles and liquid are preferably mixed and left to stand for a short interval of time to ensure permeation of solid particles with liquid prior to serving. The resulting moist food is a gelatineous mass which is ready to be transferred into a tray or the like for presentation to the pet. For example, the vessel in which the mixture of flakes and chunks is to be contacted by a liquid can be provided with a conically shaped chamber and with notches or other graduations to facilitate the introduction of optimal quantities of solid and liquid constituents of the food which is then ready to be served to a dog or a cat.

The vessel can be dimensioned in such a way that it can accept a daily ration of solid and liquid constituents or that it merely contains a ration for a single meal. Thus, it is not necessary to open a can and to discard the unconsumed moist contents because the non-utilized solid constituent of the improved food simply remains in the bag and can be stored for long periods of time without spoilage.

It is equally possible to serve the food dry or by adding minimal quantities of a liquid (e.g., water) so that the food is practically dry upon completion of the liquid admitting step.

An important advantage of the improved method is that the mixture of flakes, chunks or lumps and additives (such as a gelling agent and micronutrients) need not be stored in cans. Another advantage of the improved method is that, once the mixture of solid ingredients is contacted by a liquid, the thus obtained food resembles a gel wherein the individual chunks or lumps and flakes are visible but the animal is incapable of consuming only selected ingredients, such as the chunks or lumps of meat or fish. A further advantage of the improved method is that the constituents of its flaky and/or chunky ingredients need not undergo any drastic thermal and/or other treatment which could adversely affect the appearance and/or taste of the food, e.g., by destroying the vitamins.

The second step can include utilizing meat and poultry or fish together with one or more chopped vegetables, for example, carrots, leek, cabbage, spinach, celery or any others. The third step can include mixing the above-mentioned ingredients with therapeutical products to produce a medical food. This renders it possible to avoid selective nutrition which is very important for medical foods.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of making moistenable dry food for animals, comprising the steps of forming flakes of a first ingredient which is selected from the group consisting of cereals and legumes, including moisturizing, crushing and thereafter drying the first ingredient at a temperature of between approximately 50° and 70° C.; forming chunks of a second ingredient which is selected from the group consisting of animal proteins and, including drying the second ingredient; and mixing flakes of the first ingredient and chunks of the second ingredient with a gelling agent.

2. The method of claim 1, wherein the legumes are selected from the group consisting of beans and peas.

3. The method of claim 1, wherein the animal proteins are selected from the group consisting of meat and fish.

4. The method of claim 1, wherein said step of making flakes further comprises husking the first ingredient prior to moisturizing.

5. The method of claim 1, further comprising the step of adding at least one micronutrient.

6. The method of claim 5, wherein the at least one micronutrient is added not later than in the course of said mixing step.

7. The method of claim 5, wherein the at least one micronutrient is added in encapsulated form.

8. The method of claim 1, wherein the gelling agent is polysaccharide.

9. The method of claim 1, wherein the gelling agent is a protein.

10. The method of claim 1, wherein the gelling agent is a hydrolisate of a protein.

* * * * *